Patented Feb. 19, 1952

2,586,325

UNITED STATES PATENT OFFICE 2,586,325

PRODUCTION OF ETHANOLAMINE

William F. Gresham, Wilmington, Del., assignor to E. I. du Pont de Nemours & Company, Wilmington, Del., a corporation of Delaware No Drawing. Application August 1, 1947, Serial No. 765,653

3 Claims. (Cl. 260—584)

This invention relates to a process for the preparation of ethanolamines, and more particularly to the preparation of the ethanolamines by the hydrogenation of formaldehyde cyanhydrin in the presence of an alcohol or ether thereof. This application is a continuation-in-part of application S. N. 545,003, filed July 14, 1944, and abandoned after the filing of the instant application.

It is known that formaldehyde cyanhydrin is a relatively unstable compound, and attempts to convert it by reduction or hydrogenation to its corresponding hydrogenation products have been commercially unsuccessful, principally because of the large amounts of decomposition products obtained simultaneously with the desired products. Attempts to improve the process have usually resulted in forming not the desired hydrogenation product but crude reaction mixtures from which it was substantially impossible to recover economically the desired product.

An object of the present invention is to provide an improved process for the preparation of ethanolamines from formaldehyde cyanhydrin by hydrogenation. Another object is to make the ethanolamines by the liquid phase hydrogenation of formaldehyde cyanhydrin the presence of an aliphatic alcohol or ether thereof. A further object is to provide suitable reaction conditions and catalysts for conducting the process. Other objects and advantages of the invention will hereinafter appear.

The process is conducted by passing formaldehyde cyanhydrin and a lower aliphatic alcohol or ether thereof into a reaction zone charged with a suitable hydrogenation catalyst and effecting the reaction in the presence of hydrogen at a rapid rate. An excess of the alcohol or ether is used to inhibit the formation of decomposition products during the reaction, and a large amount of catalyst is used to convert the formaldehyde cyanhydrin so rapidly to the ethanolamines that there is little decomposition. An important feature of the invention resides in the surprising discovery that with the use of Raney nickel catalyst much higher yields are obtained than from other hydrogenation catalysts. Furthermore, the reaction is preferably conducted in such a way that contact between the ethanolamines and the cyanhydrin hydrogenated is avoided as much as possible.

The low molecular weight aliphatic monohydric non-cyclic alcohols which are used as solvents include: methanol, ethanol, n- and isopropanol, and n- and isobutanol; the ethers of these alcohols may likewise be used, e. g., dimethyl and diethyl ethers. The presence of the solvent inhibits the formation of decomposition products of the cyanhydrin and consequently assists in directing the course of the reaction toward the formation of the ethanolamines. These solvents should preferably be employed in amounts to give solutions containing by weight from in the order of 4 to 20 parts per part of formaldehyde cyanhydrin.

The reaction is preferably conducted in the liquid phase and in the presence of a suitable hydrogenation catalyst, such, for example, as nickel, cobalt, fused nickel-cobalt, copper chromite catalyst, or other well-known hydrogenation catalysts known to be useful in the hydrogenation of nitriles to amines. The preferred catalyst is a Raney nickel catalyst containing about 15% aluminum. The reaction is conducted at a temperature ranging from 25 to 200° C. and a pressure, which is not critical, from 1 to 1000 atmospheres. It is preferred, however, to conduct the hydrogenation of these nitriles at temperatures between 25 and 150° C. and under a pressure between 200 and 700 atmospheres.

In addition to using a dilute solution another necessary limitation to conducting the reaction in order to obtain practical yields is that there should be present more catalyst than is normally employed in nitrile hydrogenation. Ordinarily in conducting catalytic hydrogenation reactions, catalysts are used to the extent of about ½ up to a maximum of about 10% based on the weight of the compound to be hydrogenated. It has been found, however, in the hydrogenation of formaldehyde cyanhydrin to ethanolamines that there should be present a considerable excess of catalyst over this amount, and this is true even with highly active catalyst such as the Raney nickel catalysts. It has been found that generally the catalyst should be present in amounts ranging from 25% to in the order of 250% or more, based on the weight of formaldehyde cyanhydrin present.

The more detailed practice of the invention is illustrated by the accompanying examples of preferred embodiments of the invention, in which parts are by weight unless otherwise stated:

ETHANOLAMINES

Example 1

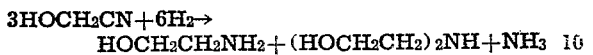

$$3HOCH_2CN + 6H_2 \rightarrow$$
$$HOCH_2CH_2NH_2 + (HOCH_2CH_2)_2NH + NH_3$$

A silver-lined high pressure-resisting shaker tube was charged with 7 parts of formaldehyde cyanhydrin, 140 parts of methanol, and 20 parts of a nickel alloy skeleton catalyst obtained by extracting aluminum from a nickel alloy containing 48% nickel and 52% aluminum, 85% of its aluminum content being removed by leaching with an alkali. Hydrogen was introduced and the reaction conducted at a temperature between 98 and 100° C. under a pressure of 700 atmospheres for approximately 1 hour. The pressure was released and the products filtered from the catalyst and separated by fractional distillation. Upon analysis, a 29% conversion of the formaldehyde cyanhydrin to ethanolamine, and a 44% conversion to diethanolamine, was obtained.

Example 2.—The process of Example 1 was substantially duplicated, using 7 parts of formaldehyde cyanhydrin, 140 parts of dimethyl ether, and 20 parts of the nickel catalyst. The hydrogenation was conducted at a temperature of 98 to 108° C. for approximately ¾ hr. A 13.3% conversion of the formaldehyde cyanhydrin to ethanolamine, 54.5% conversion to diethanolamine, and 11.5% conversion to triethanolamine was realized.

Example 3.—The process of Example 1 was substantially duplicated, using a reaction mixture containing 7 parts of formaldehyde cyanhydrin, 100 parts of isobutanol, and 20 parts of the nickel catalyst, and the reaction was conducted at a temperature between 101 and 118° C. for ¾ hr. The product analyzed on the same basis 16.4% ethanolamine, 60.5% diethanolamine, and 1.3% triethanolamine. Higher boiling compounds were also formed.

Example 4.—The process of Example 1 was substantially duplicated, but with a lower ratio of catalyst to reactants, there being present 14 parts of formaldehyde cyanhydrin, 140 parts of methanol, and 20 parts of the nickel catalyst. The reaction was conducted at a temperature between 100 and 105° C., for approximately 1 hour. A reaction mixture was obtained containing such large amounts of decomposition products that it was found impractical to separate therefrom any alkanolamines.

Example 5.—A 20% solution of formaldehyde cyanhydrin in methanol was passed into a silver-lined saturator of 23″ in length and ⅞″ in diameter together with hydrogen, the hydrogen being introduced in sufficient amounts to give a pressure of between 695 and 715 atmospheres, giving a 2000 to 2400% excess of hydrogen. The mixture from the saturator was continuously passed at a space velocity per hour of 1 into the bottom of a silver-lined converter 9/16″ inside diameter and 5′ in length, in which an 85% activated Raney nickel catalyst was disposed having a mesh size from 8 to 14. The temperature of the converter was maintained at between 62 and 64° C. The products were continuously removed from the top of the converter, collected, and analyzed, and found to give 50% diethanolamine, 18.3% monoethanolamine, 3.5% n-methyl diethanolamine, 3.2% n-methyl monoethanolamine, and 0.9% beta-hydroxyethyl ethylenediamine conversion based on the formaldehyde cyanhydrin introduced.

Example 6.—The process of Example 5 was substantially duplicated by the introduction of a 10% solution of formaldehyde cyanhydrin in methanol, the reaction being conducted at a temperature between 40 and 41° C., a pressure of 735 atmospheres, and a space velocity in hours of 1. The hydrogen was used in an excess of between 1000 and 1100%. An 8 to 14 mesh Raney nickel catalyst was used activated to 90%, and there was obtained 33.7% diethanolamine, 13.1% monoethanolamine, 16.5% n-methyl diethanolamine, and 7.1% n-methyl monoethanolamine, based on the formaldehyde cyanhydrin charged.

All of the processes described in the examples were carried out under a hydrogen pressure of approximately 700 atmospheres.

The surprising and unexpected ability of the aforesaid solvents, and especially the alcohols and methanol, to stabilize formaldehyde cyanhydrin is exemplified by the fact that at 90 to 95° C., this cyanhydrin decomposes in 6 to 8 minutes to a black tarry liquid, while 15.7 grams of the cyanhydrin in 140 grams of methanol, after being heated for 2 hours at 100° C., gave an 84% recovery of the cyanhydrin and 14.4 grams of the cyanhydrin in 140 grams of methanol at 125° C. for 2 hours gave a recovery of 75% formaldehyde cyanhydrin.

The process may, if desired, be carried out by way of a continuous process as distinguished from a batchwise process. By such a process the cyanhydrins, together with the inert solvent and hydrogen, are introduced continuously into a reaction zone, which may, for example, be a cylindrical converter in which the ratio of diameter to length is not greater than about 1:10. The converter is charged with the catalyst and with substantially no free space at the inlet end, so that substantially immediately after the introduction of the reactants they directly contact a relatively large volume of the catalyst under the temperatures and pressures of hydrogenation. This type of converter avoids undue mixing of the ethanolamines with formaldehyde cyanhydrin and thereby inhibits the formation of reaction products resulting from such mixtures.

I claim:

1. A process for the preparation of ethanolamine and diethanolamine which comprises passing into a reaction zone hydrogen, formaldehyde cyanhydrin, and per part by weight of the formaldehyde cyanhydrin from 4 to 20 parts of methanol, conducting the reaction therein in the presence of at least 25% by weight based on the formaldehyde cyanhydrin of a nickel-aluminum hydrogenation catalyst, prepared by extracting approximately 85% of the aluminum from the nickel alloy containing 48% nickel and 52% aluminum, the reaction being conducted at a temperature between 25 and 150° C. and a hydrogen pressure between 200 and 700 atmospheres and continuously withdrawing the ethanolamine and diethanolamine from the reaction zone.

2. A process for the preparation of ethanolamine and diethanolamine which comprises subjecting to hydrogenation a reaction mixture containing formaldehyde cyanhydrin and per part by weight of the formaldehyde cyanhydrin from 4 to 20 parts of methanol, the reaction being conducted in the presence of at least 25% by weight based on the formaldehyde cyanhydrin of a nickel-aluminum skeleton catalyst at a temperature between 25 and 150° C. and under a pressure between 200 and 700 atmospheres.

3. A process for the preparation of ethanolamine and diethanolamine which consists in subjecting a reaction mixture containing in parts by weight 7 parts of formaldehyde cyanhydrin, 140 parts of methanol and 20 parts of a nickel aluminum alloy skeleton catalyst to hydrogenation at a temperature between 98 and 100° C. and under a hydrogen pressure of approximately 700 atmospheres.

WILLIAM F. GRESHAM.

REFERENCES CITED

The following references are of record in the file of this patent:

UNITED STATES PATENTS

| Number | Name | Date |
|---|---|---|
| 2,069,302 | Dreyfus | Feb. 2, 1937 |

FOREIGN PATENTS

| Number | Country | Date |
|---|---|---|
| 573,983 | Germany | Apr. 8, 1933 |
| 598,984 | Great Britain | Mar. 2, 1948 |